United States Patent Office 3,262,995
Patented July 26, 1966

3,262,995
POLYMERIZATION OF ACRYLONITRILE IN THE PRESENCE OF A PHOSPHORUS-CONTAINING VINYL AROMATIC POLYMER
Terrence Huff, Texas City, and Eli Perry, Galveston, Tex., assignors to Monsanto Company, a corporation of Delaware
No Drawing. Filed Dec. 20, 1961, Ser. No. 160,897
6 Claims. (Cl. 260—881)

The present invention relates to the preparation of block polymers of acrylonitrile and α-substituted acrylonitriles and vinyl aromatic monomers such as styrene. More particularly, it relates to a novel method for the preparation of such polymers.

It is well known that polymers of vinyl aromatic monomers such as styrene find many uses as molded articles which may be formed by such conventional methods as compression or injection molding, extrusion, welding, hot pressing, etc. Such polymers are transparent and possess good tensile strength as well as good electrical properties. However, they do not possess a high degree of heat resistance. On the other hand, polymers of acrylonitrile and α-substituted acrylonitriles possess excellent heat resistance but are not readily moldable. To overcome these difficulties, methods have been developed for copolymerization of the vinyl aromatic compounds and the unsaturated nitriles to provide polymerization products having improved properties over those of the homopolymers. But it has not been easy to prepare consistently good products by copolymerization of these types of monomers. The polymerization reaction is strongly exothermic and, hence, difficult to control, particularly if it is desired at the same time to control the molecular weight of the resin product. Further, the microstructure of the polymers are not controllable in the usual type of copolymerization and the microstructure determines the properties for a given ratio of ingredients.

Another method which is employed to overcome the disadvantages mentioned can be characterized as "polyblending." This involves physical intermixture by mastication, mixing, etc., of two specific homopolymers to obtain a resin having different properties from either of the constituent polymers. While some improvement can be effected in this manner also, inherent limitations exist in this method and it is not suitable under certain circumstances or for obtaining specific desired physical characteristics.

Still another method involves polymerization to form so-called block polymers, polymers which are characterized by a structure distinct from ordinary copolymers or polyblends and which by consequence possess desired physical properties not characteristic of the copolymers or polyblends. Only a limited amount of work has been done, however, in the preparation of block polymers from α,β-olefinically unsaturated nitriles.

It is, therefore, an object of the present invention to provide a new method for preparing block polymers of α,β-olefinically unsaturated nitriles, specifically, acrylonitrile and α-substituted acrylonitriles, and vinyl aromatic compounds which are known to be readily moldable, have high heat resistance, stiffness, and good weathering resistance. Other objects and advantages of the invention will be apparent from the following description thereof.

According to the invention, block polymers of acrylonitrile and α-substituted acrylonitriles and vinyl aromatic compounds are prepared by the steps of: (1) polymerizing the vinyl aromatic monomer by a free-radical mechanism in the presence of a phosphine as a chain-transfer agent to obtain a polymer of the vinyl aromatic compound containing phosphorus in the polymer chains; and subsequently (2) polymerizing acrylonitrile or α-substituted acrylonitrile in the presence of the phosphorus-containing vinyl aromatic polymer as an initiator so that the nitrile polymer becomes attached to the vinyl aromatic polymer chains to form a block polymer of the two compounds.

The following examples are presented to illustrate the invention but are not to be construed as limiting it any manner whatsoever.

*Example 1*

Approximately 107 ml. of freshly distilled styrene was charged under argon to a three-necked polymerization flask fitted with a stirrer and gas inlet and outlet means. To the styrene there was added 5.6 ml. of a solution of 0.18 ml. of diethyl phosphine dissolved in 10 ml. of styrene. The flask was immersed in an oil bath and its contents heated to a temperature of approximately 100° C. for a period of 10 hr. with 0.7 cc. of the diethyl phosphine-in-styrene solution being added every two hours. At the end of this time, the flask was cooled rapidly to room temperature and excess monomer and phosphine were removed from the reaction mixture under high vacuum over a period of 36 hr. About 19.0 g. of polystyrene was obtained having a degree of polymerization of about 400 as calculated from intrinsic viscosity measurements made on a benzene solution of the polymer at 20° C. Chemical analysis of the polystyrene product established that over 95% of the polystyrene chains contained a phosphorus atom.

To a three-necked flask maintained under an inert atmoshere at room temperature was charged about 18.5 g. of the phosphorus-containing polystyrene (which had been dried under high vacuum for 48 hr.) dissolved in 230 ml. of pure dry dimethylformamide and 100 ml. of acrylonitrile of extremely high purity which had been carefully dried over calcium hydried. The mixture was stirred continuously. After about 2 min. the solution turned light yellow and warmed up to about 35° C. The flask was then immersed in a water bath to control the temperature at approximately room temperature (22° C.) and maintained thus with constant stirring of the reaction mixture for about one week (168 hr.). At the end of this reaction period, 400 ml. of dimethylformamide was added to the reaction mixture and the polymer was precipitated by adding the reaction mixture to 3.5 liters of methanol. The resulting slurry was filtered and the solid polymer separated was washed with methanol and dried under high vacuum at 45° C. The yield of polymer obtained was 51 g. including the 18.5 g. of polystyrene onto which 32.5 g. of acrylonitrile was polymerized representing a polymer having a composition of 64% by weight of polyacrylonitrile and 36% by weight of polystyrene.

*Example 2*

About 9.6 g. of phosphorus-containing polystyrene was prepared as described in Example 1 and then dried for 48 hr. under high vacuum at 50° C. This polymer having a degree of polymerization of 450 was charged to a three-necked polymerization flask equipped with a stirrer and containing 250 ml. of pure acrylonitrile maintained at room temperature (22° C.) under an atmosphere of pure nitrogen and stirred continuously. The mixture turned pale yellow after several minutes and a sticky yellow mass formed as the mixture warmed up slightly. The temperature was controlled at room temperature over a reaction period of about one week (168 hr.). At the end of this time, 200 ml. of dimethylformamide was added to the reaction mixture and the resulting mass was poured into 2.5 liters of methanol to precipitate the polymer formed. The resulting slurry was filtered and the solid polymer which separated was washed and dried thoroughly under high vacuum at 50°

C. A yield of 30.5 g. of polymer was obtained including the 9.6 g. of polystyrene charged onto which 20.9 g. of acrylonitrile had been polymerized, i.e., a polymer having a composition of 68% polyacrylonitrile and 32% polystyrene.

*Example 3*

The procedure of Example 2 was repeated except that pure polystyrene was substituted for the phosphorus-containing polystyrene. No increase in the amount of polymer product recovered was obtained. Only the original amount of polystyrene charged was recovered. A chemical analysis showed that no nitrogen had been incorporated into the polymer.

*Example 4*

Following the procedure recited in Example 1, 110 ml. of pure, dry styrene was polymerized in the presence of dibutyl phosphine at 100° C. for 10 hr. with 5.3 ml. of a master solution containing 0.38 ml. of dibutyl phosphine in 10 ml. of styrene being charged initially and 0.65 ml. of this same solution being added every two hours. The polymer was recovered in this instance by adding the reaction mixture to about five times its volume of methanol, filtering the resulting slurry, and drying. A yield of 18.2 g. of phosphorus-containing polystyrene having a degree of polymerization of 285 was obtained.

Following the procedure of Example 2, 8.9 g. of the phosphorus-containing polystyrene was reacted with 230 ml. of pure acrylonitrile for a period of one week. A yield of 18.9 g. of polymeric product was obtained including the 8.9 g. of polystyrene charged onto which 10.0 g. of acrylonitrile was polymerized. Stated another way, the polymer product had a composition of 53.5% by weight of polyacrylonitrile and 46.5% of polystyrene.

*Example 5*

Pure, water-free styrene (19.4 ml.) was subjected to polymerization for 2 hr. at 100° C. in the presence of 0.586 ml. of tributyl phosphine. The phosphorus-containing polystyrene was recovered by evaporation of the unreacted monomer and dried thoroughly. A yield of 0.4371 g. of polymer having a degree of polymerization of 700 was obtained. This polymer was dissolved in 5 ml. of extremely pure, dry tetrahydrofurane which had been refluxed over sodium and this solution was added to 3 ml. of highly purified acrylonitrile in a polymerization flask. The flask was maintained at room temperature while the reaction mixture was stirred continuously for a period of one week. The polymeric product was recovered from the reaction mixture by precipitation from methanol in the manner described in the previous examples. A yield of 0.6527 g. of polymer was obtained including the 0.4371 g. of polystyrene onto which was polymerized 0.2156 g. of acrylonitrile indicating a block polymer containing 33% acrylonitrile and 67% styrene.

*Example 6*

The structure of the polymers of Examples 1, 2, and 4 was established to be that of block polymers rather than that resulting from a simple mixture of the homopolymers by means of extraction with toluene, solubility tests in dimethylformamide, precipitate fractionation, differential thermal analysis and Koeffler Bar sticking temperatures. Results of extraction of the polymers with toluene at 110° C. in a Soxhlet extractor are presented below together with results obtained simultaneously on polyblends of the homopolymers in the indicated percentage ranges. All analyses were made by means of infrared spectra.

| Polymer Sample | Styrene in Charge (percent) | Total Charge (g.) | Residue | | Extract | | Minimum Percent Block [1] |
| --- | --- | --- | --- | --- | --- | --- | --- |
| | | | Percent of Charge | Percent Styrene | Percent of Charge | Percent Styrene | |
| Blend A | 50 | 0.37 | 51 | 10 | 40 | 100 | 4 |
| Blend B | 50 | 0.24 | 46 | 7 | 40 | 100 | 1 |
| Blend C | 42 | 0.35 | 55 | 2 | 38 | 100 | ~0.5 |
| Ex. 1 | 36 | 0.35 | 76 | 15 | 21 | 100 | 16 |
| Ex. 2 | 32 | 0.31 | 78 | 24 | 7 | 93 | 27 |
| Ex. 4 | 46 | 0.37 | 72 | 21 | 26 | 100 | 20 |

[1] Polystyrene in Residue×100 / Weight Original Sample

It is readily apparent from the foregoing data that the polymers produced in the examples are block polymers of styrene and acrylonitrile and not mere mixtures of polystyrene and polyacrylonitrile. Data from all the other tests mentioned above also substantiate this conclusion.

The invention is not to be considered limited to the particular monomer reactants and conditions presented in the examples. For example, other vinyl aromatic compounds other than styrene may be employed as well as this compound. Suitable compounds are those represented by the formula

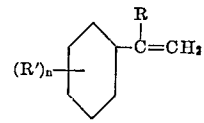

wherein R is selected from the group consisting of hydrogen, the halogens, and methyl radicals, R' is a substituent selected from the group consisting of hydrogen, the halogens, and alkyl, amino, nitro, hydroxy, carboxy, alkoxy, and cyano radicals and $n$ is an integer between 0 and 2. Among such compounds besides styrene itself are nuclear-substituted alkylstyrenes such as o-, m-, and p-methylstyrene, p,n-butylstyrene, m-ethylstyrene, o-hexylstyrene, p-(2-ethylhexyl)styrene, 2,4-dimethylstyrene, 2,5-diethylstyrene, and the like; nuclear-substituted halostyrenes such as 2,4-dichlorostyrene, 2,5-dichlorostyrene, and the like; side chain alkyl and halo-substituted styrenes, e.g., α-chlorostyrene, α-methylstyrene, and the like; p-aminostyrene, 2,3-diaminostyrene, 2,5-diaminostyrene, and the like; o-, m-, and p-nitrostyrene, o-hydroxystyrene, 3,4-dihydroxystyrene, and the like; p-acetoxystyrene, p-ethoxystyrene, m - methoxystyrene, 3,4 - dimethoxystyrene, and the like; o-, m-, and p-cyanostyrene, and the like. Mixtures of these compounds may also be employed if desired.

Likewise, acrylonitrile is only one of many nitriles which can be employed in formation of the block polymers by the method of the invention. α-Substituted acrylonitriles, i.e., nitriles of the formula

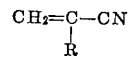

wherein R is selected from the group consisting of hydrogen, the halogens, the cyano radical, and hydrocarbon, substituted hydrocarbon and alkoxy radicals having from 1 to 18 carbon atoms. The hydrocarbon radicals may be cyclic or acyclic, saturated, unsaturated or aromatic such as the alkyl, alkenyl, aryl, alkaryl, alkenaryl, aralkyl, aralkenyl, cycloalkyl and cycloalkenyl radicals. Examples of the hydrocarbon radicals are methyl, propyl, isopropyl, n-butyl, isobutyl, tert-butyl, hexyl, n-octyl, carbinyl, pentenyl, hexenyl, phenyl, diphenyl, naphthyl, anthryl, tolyl, dipropylnaphthyl, cyclohexenyl, trimethylcyclohexyl, cyclopentenyl, and the like.

The substituted hydrocarbon radicals represented by R are those hydrocarbon radicals described above wherein one or more hydrogen atoms have been replaced by an inorganic element or radical or by an organic radical containing one or more oxygen, nitrogen, or sulfur atoms. Examples of the organic radicals containing inorganic elements that may be attached to the hydrocarbon radicals are the hydroxyl, carboxyl, ether, thioether, and the like radicals. Substituted hydrocarbon radicals included by R are, for example, hydroxyethyl, acetoxybutyl, chlorophenyl, 3-nitrophenyl, 4-bromoheptyl, acetylethyl, nitrocyclohexyl and the like.

Examples of unsaturated nitriles coming within the scope of the invention include, in addition to acrylonitrile exemplified, methacrylonitrile, $\alpha$-ethylacrylonitrile, $\alpha$-propylacrylonitrile, $\alpha$-chloroacrylonitrile, $\alpha$-phenylacrylonitrile, $\alpha$-naphthylacrylonitrile, $\alpha$-(2-chlorobutyl)acrylonitrile, $\alpha$-methoxyacrylonitrile, $\alpha$-(2-chloroethyl)acrylonitrile, $\alpha$-butylacrylonitrile, $\alpha$-(4-hydroxyphenyl)acrylonitrile, vinylidene cyanide, $\alpha$-hexylacrylonitrile, and the like.

A particularly preferred group of nitriles for the process of the invention are those wherein R in the foregoing formula is hydrogen, a halogen, or an alkyl radical containing from 1 to 6 carbon atoms, e.g., acrylonitrile, methacrylonitrile, $\alpha$-chloroacrylonitrile, $\alpha$-ethylacrylonitrile, $\alpha$-n-butylacrylonitrile and the like.

The phosphines which can be employed as chain-transfer agents in the first step of the polymerization process of the invention are those having the formula

wherein $R_1$, $R_2$ and $R_3$ are the same or different and are selected from the group consisting of hydrogen, alkyl, haloalkyl, alkoxyalkyl, and aryloxyalkyl radicals containing from 1 to 8 carbon atoms. Such compounds include the diethyl phosphine, dibutyl phosphine and tributyl phosphine exemplified along with phosphine itself, trimethyl phosphine, dipropyl phosphine, methyl ethyl phosphine, methyl diethyl phosphine, triethyl phosphine, di(chloroethyl) phosphine, tri(chlorobutyl) phosphine, phenylethyl phosphine, di(phenylmethyl)phosphine, tri(methoxyethyl)phosphine, di(methoxymethyl)phosphine, butoxymethyl isobutyl phosphine and the like. Particularly preferred are the alkyl phosphines encompassed by the foregoing formula.

The first step of the polymerization process wherein the vinyl aromatic monomer is polymerized by a free-radical mechanism in the presence of a phosphine as a chain-transfer agent may be carried out thermally or with the aid of a catalyst. The catalytic polymerization of vinyl aromatic compounds with free-radical-type catalysts is so well known that anyone skilled in the art will be able without difficulty to select a catalyst if one is desired. It is understood, of course, that the catalyst employed must be one which does not destroy the phosphine chain-transfer agent during the polymerization. By way of example, the following suitable catalysts are mentioned: peroxygen compounds, for example, diacyl peroxides such as acetyl peroxide, benzoyl peroxide, lauroyl peroxide, and alkali and ammonium persulfates, perborates, and percarbonates; amine oxides such as trimethylamine oxide, triethylamine oxide, and dimethylamine oxide; azonitriles such as $\alpha,\alpha'$-azodiisobutyronitrile, $\alpha,\alpha$-azodi-($\alpha$-ethyl)butyronitrile and $\alpha,\alpha'$-($\alpha$-cyclohexyl)propionitrile; hydrazine salts such as hydrazine dihydrochloride and hydrazine sebacate; ultraviolet light; and other peroxides such as hydrogen peroxide, diethyl peroxide, cyclohexanone peroxide and the like. The amount of catalyst used generally varies from about 0.001% to about 10% by weight of the monomer to be polymerized.

The initial polymerization reaction can be carried out over a wide range of temperatures from below room temperature (approx. $-100°$ C.) to over 250° C. The preferred temperature depends to some extent on the particular vinyl aromatic compound being polymerized, the particular catalyst when one is used and the particular phosphine employed as the chain-transfer agent. Generally, preferred temperatures for this first step of the process are those in the range from about 80° C. to about 150° C. The upper range of temperature is limited in individual systems by the decomposition temperature of the reactants employed. Any appreciable decomposition of the phosphine must be avoided if it is to function as a chain-transfer agent.

The first process step may be conducted at atmospheric pressure but superatmospheric pressures and subatmospheric pressures may also be employed. Pressures as high as 2000 atmospheres can be used and the ultimate pressure limit for the reaction is set only by the limitations of the available equipment. The preferred pressure range for the majority of the reactions of the present invention is 1–50 atmospheres.

The concentration of phosphine in the polymerization of the vinyl aromatic compound can also be varied over very wide limits. In general, an increase in the concentration of the phosphine in relation to the monomer produces a decrease in the average molecular weight of the product. The preferred concentration of the chain-transfer agent will generally be in the range from about 0.00001% to about 50% by weight of the monomer. Concentrations as high as 100% or more are also useful, however, depending upon the end-product desired.

Since the reaction in the first step of the process is an exothermic one, it may be conducted, if desired, in the presence of an inert diluent which will act to absorb some of the heat. Suitable diluents include, for example, low-boiling liquids which are relatively inert under the reaction conditions such as aliphatic hydrocarbons, cycloaliphatic hydrocarbons, aromatic hydrocarbons, aliphatic ethers, and cycloaliphatic ethers. This technique is similar to that commonly referred to as solution polymerization whereas polymerization in the absence of any diluents parallels so-called bulk or mass polymerization.

Operation may be batchwise or on a continuous basis. All of the reactants may be charged simultaneously or the phosphine may be premixed with the monomer, or in some cases it may be desirable to add monomer or the phosphine to the system as the reaction progresses. Frequently, when a catalyst is employed, the reaction may be more effectively controlled by adding the catalyst to the system in portions or in a slow continuous fashion as the reaction progresses. This can be done by injecting a solution of the catalyst in the monomer or in an inert solvent. In a continuous system, for example, a mixture of the vinyl aromatic monomer, the phosphine chain-transfer agent, and the catalyst, if one is used, can be passed continuously through a reaction zone maintained under polymerization conditions. Alternatively, the catalyst can be injected into the system of the monomer and phosphine which is passing through the reaction zone. In some cases it is advantageous to add one of the reactants to the mixture in the reaction zone so as to offset any marked change in concentration in one of the reactants which might occur due to the rate of the reaction. Continuous operation facilitates control of the reaction and is usually more flexible than batch operation.

The phosphines can react with oxygen under certain conditions. Thus, while oxygen in small concentrations can act as a catalyst in the vinyl polymerization reaction, its presence in any substantial quantity should be avoided. It is preferable to keep the molecular oxygen content of the reaction system at an absolute minimum and the reaction is, therefore, best conducted under an atmosphere of an inert gas such as nitrogen, argon, methane, and the like.

The phosphine-containing polymer product from Step 1 is readily recovered by known techniques such as by evaporation of the unreacted monomer or by precipitation in excess methanol followed by filtration and drying.

In the second step of the process of the invention for producing block polymers, acrylonitrile or an α-substituted acrylonitrile is polymerized in the presence of the phosphorus-containing polymer from Step 1 as the initiator of polymerization. This reaction can be carried out over a wide range of temperatures from about −50° C. to about 150° C. Preferably, however, the reaction is effected at temperatures from about 20° C. to about 50° C.

In preferred operation, the second polymerization step is conducted at atmospheric pressure but, as in Step 1, superatmospheric or subatmospheric pressures can also be employed.

Since this reaction, too, is an exothermic one, provision must be made for heat removal. This can be accomplished, if desired, by conducting the polymerization in the presence of an inert diluent. Inert organic solvents such as dimethylformamide, dimethylsulfoxide, tetrahydrofurane, dioxane and like materials are suitable for this purpose.

Operation of the nitrile polymerization step can be batchwise or on a continuous basis. Continuous operation is usually more flexible than batch operation and for this reason is preferred.

The relative proportions of phosphorus-containing polymer and nitrile employed in the polymerization can be varied widely depending upon the type of product desired. The amount of phosphorus-containing polymer in the polymerization charge can be such that the final block polymer product contains anywhere from 0.01% by weight to 99.8% by weight of the polynitrile. Generally, the lower the content of the polynitrile in the polymer, the better will be its flow properties. A very useful range of polymers is obtained when the polynitrile content is maintained below about 30%.

The degree of polymerization of the block polymers made by the method of the invention is regulated by the molar ratio of monomer and phosphine in the first step or by the amount of the nitrile employed in the second step.

Recovery of the block polymers can be effected by any of the known conventional techniques. A particularly simple and efficient method involves precipitation in a compound such as methanol, which is a solvent for the monomer but not for the polymer, followed by filtration and drying.

While the foregoing description of the invention has been directed generally to the preparation of block polymers of styrene and substituted styrenes with unsaturated nitriles, the method of the invention is not to be considered as limited to polymerization of such vinyl aromatic compounds. Any vinyl monomer in the polymerization of which the phosphines disclosed herein act as chain-transfer agents can be substituted for the vinyl aromatic compounds disclosed. Suitable examples of such monomers include, for example, vinyl toluene, vinyl naphthalene, vinyl acetate, methyl acrylate, ethyl acrylate, methyl methacrylate, methyl vinyl ketone, vinyl chloride, vinyl fluoride, and the like and mixtures thereof.

What is claimed is:
1. The method of preparing block polymers which comprises the steps of
 (1) polymerizing a vinyl aromatic compound of the formula

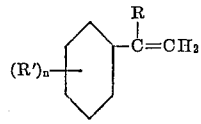

wherein R is selected from the group consisting of hydrogen, the halogens, and the methyl radical, R' is a substituent chosen from the group consisting of hydrogen, the halogens, and alkyl, amino, nitro, hydroxy, caboxy, alkoxy and cyano radicals and $n$ is an integer between 0 and 2, in the presence of a phosphine of the formula

wherein $R_1$, $R_2$, and $R_3$ are selected from the group consisting of hydrogen, alkyl, haloalkyl, alkoxyalkyl, and aryloxyalkyl radicals containing from 1 to 8 carbon atoms to form a phosphorus-containing vinyl aromatic polymer said polymerization being effected using temperatures ranging from about −100° C. to about 250° C. at which said vinyl aromatic compound yields free radicals but at which said phosphine does not decompose appreciably to yield free radicals but functions as a chain-transfer agent; and
 (2) polymerizing an acrylonitrile of the formula

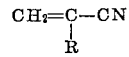

wherein R is selected from the group consisting of hydrogen, the halogens, the cyano radical, and hydrocarbon, substituted hydrocarbon and alkoxy radicals having from 1 to 18 carbon atoms in the presence of the phosphorus-containing vinyl aromatic polymer from Step (1) at a temperature in the range from about −50° C. to about 150° C.

2. The method of preparing block polymers which comprises the steps of
 (1) polymerizing a vinyl aromatic compound of the formula

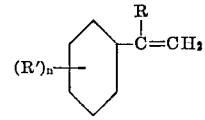

wherein R is selected from the group consisting of hydrogen, the halogens, and the methyl radical, R' is a substituent chosen from the group consisting of hydrogen, the halogens, and alkyl, amino, nitro, hydroxy, carboxy, alkoxy and cyano radicals and $n$ is an integer between 0 and 2, in the presence of a free-radical-generating compound in an amount sufficient to initiate polymerization and a phosphine of the formula

wherein $R_1$, $R_2$, and $R_3$ are selected from the group consisting of hydrogen, alkyl, haloalkyl, alkoxyalkyl, and aryloxyalkyl radicals containing from 1 to 8 carbon atoms to form a phosphorus-containing vinyl aromatic polymer, said polymerization being effected using temperatures ranging from about −100° C. to about 250° C. at which said free-radical compound decomposes but at which said phosphine does not decompose appreciably to yield free radicals; and
 (2) polymerizing an acrylonitrile of the formula

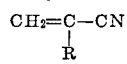

wherein R is selected from the group consisting of hydrogen, the halogens, the cyano radical, and hydrocarbon, substituted hydrocarbon and alkoxy radicals having from 1 to 18 carbon atoms in the presence of the phosphorus-containing vinyl aromatic polymer from Step (1) at a temperature in the range from about −50° C. to about 150° C.

3. The method of preparing block polymers of styrene and acrylonitrile which comprises the steps of
(1) polymerizing styrene in the presence of a phosphine of the formula

wherein $R_1$, $R_2$, and $R_3$ are selected from the group consisting of hydrogen, alkyl, haloalkyl, alkoxyalkyl, and aryloxyalkyl radicals containing from 1 to 8 carbon atoms at a temperature in the range from about 80° C. to about 150° C. to form a phosphorus-containing polystyrene; and
(2) polymerizing acrylonitrile in the presence of the phosphorus-containing polystyrene from Step (1) at a temperature from about −50° C. to about 150° C.

4. The method of claim 3 wherein said phosphine is diethyl phosphine, the temperature of polymerization of styrene in said first step is about 100° C. and the temperature of polymerization of acrylonitrile in said second step is about 22° C.

5. The method of claim 3 wherein said phosphine is dibutyl phosphine, the temperature of polymerization of styrene in said first step is about 100° C. and the temperature of polymerization of acrylonitrile in said second step is about 22° C.

6. The method of claim 3 wherein said phosphine is tributyl phosphine, the temperature of polymerization of styrene in said first step is about 100° C. and the temperature of polymerization of acrylonitrile in said second step is about 22° C.

References Cited by the Examiner
UNITED STATES PATENTS

| | | | |
|---|---|---|---|
| 2,520,601 | 8/1950 | Lee | 260—865 |
| 2,675,372 | 4/1954 | Coover et al. | 260—88.7 |
| 2,735,830 | 2/1956 | Coover | 260—881 |

FOREIGN PATENTS 805,921  12/1958  Great Britain.

OTHER REFERENCES

Smets et al.: "Journal of Polymer Science," vol. 34, January 1959, pages 295–298.

Burlant et al.: "Block and Graft Polymers," published 1960, by Reinhold Publishing Co., pages 53–61.

Ceresa: "Block and Graft Copolymers," published 1962, by Butterworth and Co. Ltd., pages 45, 46 and 62.

Schildknecht: "Polymer Processes," vol. 10, High Polymer Series, Interscience Publishers, 1956, pages 40 and 147.

MURRAY TILLMAN, *Primary Examiner.*

WILLIAM H. SHORT, *Examiner.*

J. T. GOOLKASIAN, *Assistant Examiner.*